(12) United States Patent
Kvryan

(10) Patent No.: US 12,644,809 B2
(45) Date of Patent: Jun. 2, 2026

(54) APPARATUS AND METHODS FOR SENSING MASS ACCUMULATION DEGRADATION

(71) Applicant: The United States of America, as Represented by the Secretary of the Navy, Crane, IN (US)

(72) Inventor: Armen Kvryan, Glendale, CA (US)

(73) Assignee: United States of America, as represented by the Secretary of the Navy, Washington, DC (US)

( * ) Notice: Subject to any disclaimer, the term of this patent is extended or adjusted under 35 U.S.C. 154(b) by 330 days.

(21) Appl. No.: 18/588,994

(22) Filed: Feb. 27, 2024

(65) Prior Publication Data

US 2024/0288351 A1    Aug. 29, 2024

Related U.S. Application Data

(60) Provisional application No. 63/448,690, filed on Feb. 28, 2023.

(51) Int. Cl.
*G01N 5/02* (2006.01)

(52) U.S. Cl.
CPC ..................................... *G01N 5/02* (2013.01)

(58) Field of Classification Search
None
See application file for complete search history.

(56) References Cited

U.S. PATENT DOCUMENTS

| | | | |
|---|---|---|---|
| 9,279,739 B2 * | 3/2016 | Epureanu .............. | G01M 7/027 |
| 10,031,075 B2 * | 7/2018 | Kuester ................. | G01J 5/0802 |
| 2011/0026009 A1 * | 2/2011 | Knutson .......... | G01N 33/54373 |
| | | | 356/601 |
| 2023/0381036 A1 * | 11/2023 | Bewick-Sonntag .... | A61F 13/49 |

* cited by examiner

*Primary Examiner* — Suman K Nath

(74) *Attorney, Agent, or Firm* — Naval Surface Warfare Center, Crane Division; Patrick B. Law

(57) ABSTRACT

Provided are apparatus and methods for sensing material degradation through sensing of mass accumulation. In some aspects, the apparatus and methods employ a material such as aerogel in conjunction with a force-sensing device such as a piezoelectric sensor placed in contact with or in proximity to a material under test. Degradation of the material under test is sensed by sensing a change in mass of the aerogel absorbing parts or particles of material lost by the unit under test that, in turn, acts to further place force on or deform the piezoelectric sensor enabling real time measurement of degradation by sensing changes in the output voltage of the piezoelectric sensor. These changes in output voltage may then be correlated to the mass degradation of the unit under test.

20 Claims, 4 Drawing Sheets

302

100

304

306

Processor/Processing System/Data Logger

300

400

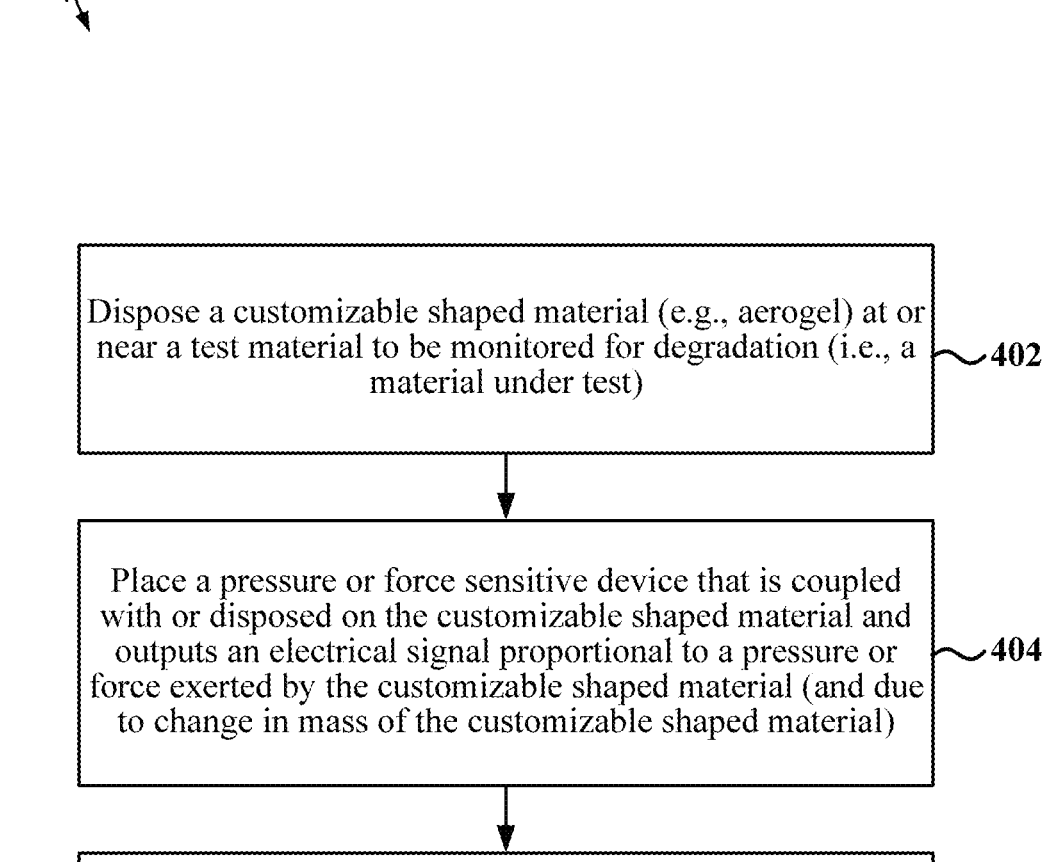

Dispose a customizable shaped material (e.g., aerogel) at or near a test material to be monitored for degradation (i.e., a material under test)          ∿402

Place a pressure or force sensitive device that is coupled with or disposed on the customizable shaped material and outputs an electrical signal proportional to a pressure or force exerted by the customizable shaped material (and due to change in mass of the customizable shaped material)          ∿404

Periodically read the output electrical signal from the pressure or force sensitive device          ∿406

Log or Store the read electrical signals          ∿408

Correlate changes in two or more of the logged/stored electrical signals to change in mass of the test material for determining degradation of the test material          ∿410

FIG. 4

APPARATUS AND METHODS FOR SENSING MASS ACCUMULATION DEGRADATION

CROSS-REFERENCE TO RELATED APPLICATIONS

This application claims priority to and the benefit of U.S. Provisional Application Ser. No. 63/448,690 filed on Feb. 28, 2023, the disclosure of which is expressly incorporated herein by reference.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 211419US02) is assigned to the United States Government and is available for licensing for commercial purposes. Licensing and technical inquiries may be directed to the Technology Transfer Office, Naval Surface Warfare Center Port Hueneme Division, email: alan.w.jaeger.civ@us.navy.mil or phone (805) 205-0638.

FIELD

The present disclosure generally relates to sensing or detecting degradation of materials and, more particularly, to apparatus and methods for sensing degradation through sensing mass accumulation.

BACKGROUND

Presently known methods of determining degradation of materials in hard to reach locations are time consuming and costly. As one example, corrosion analysis of high speed bearings found in military aircraft involves manually taking a sample of the surrounding lubricant of the bearing and performing a chemical analysis on the fluid. In this assessment, a scientist would look at the levels of iron, or any metallic particles, and determine the level of severity of corrosion based on the amount of metallic particles present in the fluid. Unfortunately, this task requires the aircraft to be down and inoperable during this process. Also, it is very costly as it requires advanced analytical techniques such as chromatography and/or mass spectrometry.

Furthermore, there are times where the fluid taken is not representative of the entire fluid contained due to movements of the metallic particles. Because of this, the fluid is usually taken at longer intervals, which means corrosion and other types of materials degradation can be occurring within the bearing housing long before any assessment is performed or scheduled. This delayed assessment has real world impacts as, in this example, bearings failures for aircraft are typically catastrophic in nature.

Accordingly, a need exists to sense the degradation of materials in real time without the need for disassembly or down time of a system being sensed.

SUMMARY

The present invention relates to apparatus and methods utilizing a material with a fixed mass and geometry and then monitoring any changes in the mass or weight of the material of a unit under test to determine material degradation. In a particular aspect, a purpose of the disclosed apparatus, which is termed herein as a mass accumulation degradation sensor (MADS), is to more accurately sense and detect any type of material degradation via a mass loss or gain. In further aspects, the mass loss or gain may be sensed via a force sensor such as a piezoelectric sensor, as one example, embedded in a material such as aerogel (or equivalents) that absorbs particles of material lost by the unit under test. The use of a piezoelectric sensor also affords delivery of real time data to a sensor interface, logging device, and/or other processing system.

According to some aspects, an apparatus for measuring the degradation of a material under test is disclosed. The apparatus includes a first material disposed in proximity to or in contact with a second material under test and configured for or capable of accumulating a portion of the second material resultant from degradation of the second material. Further, the apparatus includes a force measurement device mechanically coupled to the first material and configured to translate pressure, force, or strain exerted thereupon by the first material due to the mass of the first material including mass increase resultant from absorption of the portion of the second material into an electrical signal.

According to further aspects, a material degradation sensor for detecting degradation of a material under test is disclosed. The sensor includes a first material disposed on the material under test, where the first material has an absorbent property such that particles of the material under test lost due to material degradation thereof may be absorbed into the first material causing an increase in total mass of the first material. Further, the sensor also includes a force measurement device coupled with or in contact with the first material and configured to measure force exerted thereupon by the first material.

In yet further aspects, a method for monitoring mass degradation in a material under test is disclosed. In particular, the method includes disposing a customizable shaped material at or near the material under test. Additionally, the method includes disposing a force sensitive device to be coupled with or disposed on the customizable shaped material and configured to output an electrical signal proportional to the pressure or force change on the device due to a change in mass of the customizable shaped material due to absorption or accumulation of particles of the material under test lost due to degradation.

Additional features and advantages of the present invention will become apparent to those skilled in the art upon consideration of the following detailed description of the illustrative embodiments.

BRIEF DESCRIPTION OF THE DRAWINGS

The detailed description particularly refers to the accompanying figures in which:

FIG. 4 illustrates a flow diagram of an exemplary method according to aspects of the present disclosure.

DETAILED DESCRIPTION

The embodiments of the invention described herein are not intended to be exhaustive or to limit the invention to precise forms disclosed. Rather, the embodiments selected for description have been chosen to enable one skilled in the art to practice the invention.

The present apparatus and methods provide a material with a fixed mass and geometry and monitor any changes in the material's mass/weight. This change in mass/weight is used as a means of determining the material's degradation. Embodiments of the presently disclosed apparats styled with acronym "MADS" (Mass Accumulation Degradation Sensor) more accurately sense and detect any type of material degradation via either mass loss or gain. In a particular aspect, the mass loss and/or gain is measured or sensed using a pressure, force, or strain measurement device configured to translate pressure, force, or strain exerted thereupon into an electrical charge or signal, wherein degradation of the material results in a difference in the pressure, force or strain on the pressure, force, or strain measurement device that is, in turn, convertible into an electrical charge or signal proportional to the magnitude of the difference. In one example of such a device, a piezoelectric sensor embedded in a material such as an aerogel may be utilized for the MADS and affords realization of real time or live data to a measurement system or user.

Figure 1:
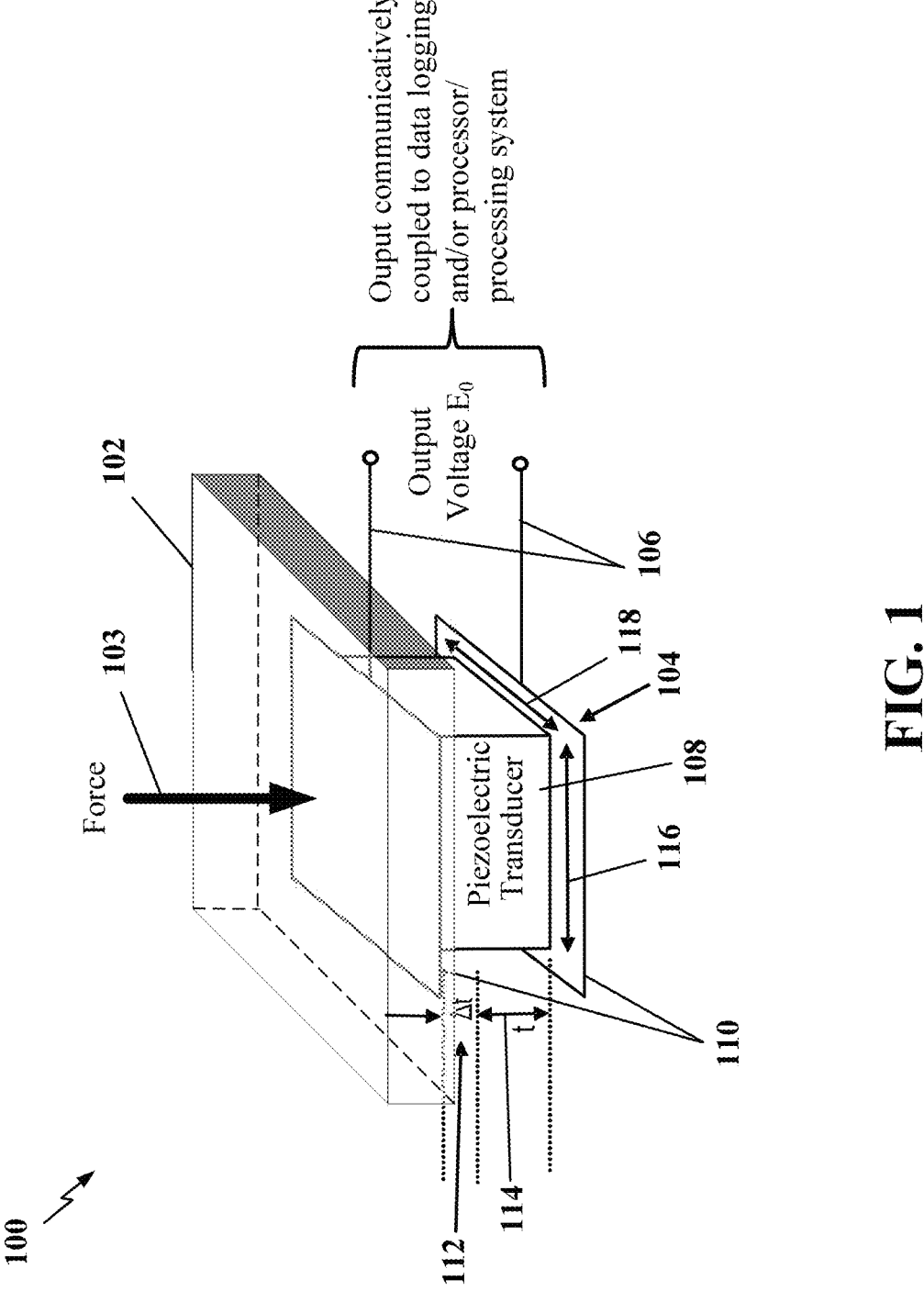
FIG. 1 illustrates an example of an apparatus for sensing and/or determining mass degradation according to certain aspects of the present disclosure.

In a particular aspect, the presently disclosed MADS may be used as a customized sensor for material degradation, by translating the change in force or pressure on the sensor due to mass accumulation or reduction of the material under test. FIG. 1 illustrates an example of such a device 100. In this exemplary device 100, a piece of "first" material or a matrix 102 is provided that can be shaped or customized to any geometric space (e.g., a housing) where the sensing capability is required (e.g., in proximity or contact with the material under test (or "second" material), which is not illustrated in FIG. 1. While shown as a rectangular block in FIG. 1, according to certain aspects the material 102 is customizable or conformable to any of a number of geometric spaces and shapes. As the material under test deteriorates it loses portions or particles of the material (and hence mass). For example, in the case of ferrous metals, this deterioration is called rust or corrosion. The loose materials from the unit under test travel and essentially get stuck to or absorbed by the first material 102, thereby increasing the mass of first material 102. This additional mass will exert additional force on an accompanying sensor (e.g., a sensor 104 such as a piezoelectric sensor, which will be discussed below) due to gravity (i.e., weight increase) or other forces (e.g., expansion). In a particular example, the first material 102 may constitute an aerogel, but is not limited to such. In further aspects, an aerogel may be any one of silica aerogel, metal oxide aerogel, or organic and carbon aerogels.

In still further aspects, it is noted that the first material 102 could consist of solgel, any of various types of porifera, any of various types of cements, any of various types of ceramics, various foams such as, but not limited to, polyurethane foam, open cell foam, charcoal foam, dry fast foam, high density foam, high resilience foam, latex foam, evlon foam, viscoelastic foam, rebound foam. In certain aspects, one desirable property of first material 102 is porosity, or more particularly, the customizability of pore size in the porous material (which will be discussed in further detail below). In particular, the pore size of the first material 102 may be configured or selected such the pore size of the material 102 matches the size of particles of interest (i.e., particles of the material of the unit under test) such that only those particles sizes that are of most interest or significance are absorbed by material 102.

According to other aspects, properties of the first material 102 that may also be desirable would depend on the application. For example, for a dynamic system that is constantly moving around, it may be desirable to ensure that the material 102 is not too rigid and has some compressibility so that it could allow the system to flex and not break; therefore low brittleness. On the other hand, for a stationary and static system, the material 102 may need to be configured to have a higher strength (e.g., a higher tensile strength). Moreover, for high heat systems, the first material 102 may need to be selected such that the material has higher or optimal thermal resistance for the heat encountered.

In still other aspects, material 102 may be used with or include thereon or within, a filtering component to achieve particle size discrimination/selection. Such membrane filtration materials can include, but not limited to, polyethersulphone, cellulose acetate, polytetraflurorethylene, nylon, cellulose nitrate, polycarbonate, etc.

In further aspects, the system 100 includes a device generating a change in voltage (or charge) when acted upon by a force or pressure 103 such as a piezoelectric sensor or sensor assembly shown at 104, as one example. The sensor 104 may be embedded either on, below, or through the first material 102 such that the force exerted by the first material 102. In the example of FIG. 1, the first material 102 is shown disposed on top of the sensor 104, but this is merely exemplary and various other configurations of the position of the first material 102 disposed on or mechanically coupled to the sensor 104 allowing the sensor 104 to measure the increase in force 103 due to absorption or deposition of increased material in the first material 102 may be contemplated.

In aspects, the sensor 104 sends an electric signal 106 as a piezoelectric sensing crystal 108 between two electrodes 110 therein reacts to a change in force/pressure that is due to mass accumulating in the material 102. Since the ratio of mass to weight is really just a force, and the piezoelectric sensor 104 will sense a mass increase and send a voltage signal that can be read as a signal signifying a mass change. This signal may be translated as a detectable material loss, and hence a material degradation of the material under test. In the example of FIG. 1, a change in the thickness t 112 shown by $\Delta t$ 114 causes the piezoelectric crystal 108 to proportionally change voltage or charge output 106, which can be translated to the particular thickness change and, ultimately, the mass accumulation in material 102 due to loss from the material under test (and also based on knowing the material properties/composition of the material under test).

In other aspects, it noted that piezoelectric transducer 104 may be operable according to the longitudinal, shear, or transverse effects, wherein the force such as force 103 applied along a specific axis of the crystal 108 will yield a change in voltage or charge proportional to a certain direction (e.g., the thickness t axis). In other aspects, other dimensions 116 and/or 118 of the crystal 108 (assuming a geometric cube shape but not limited thereto) and the forces applied in axes parallel thereto could yield measurements of force/pressure there along to indicate isotropic or anisotropic behaviors to indicate directionalities of forces being observed. This could also be accomplished by changing the location of the sensor 104 itself, In other aspects, it is noted that piezoelectric sensor 104 may be constructed using various materials such as piezoelectric ceramics, single crystal materials, or thin film piezoelectric materials. For single-crystal materials, such materials may further include gallium phosphate, quartz, or tourmaline, which may exhibit long term stability characteristics. Other single-crystal materials may include Lead Magnesium Niobate-Lead Titanate (PMN-PT).

Figure 2:
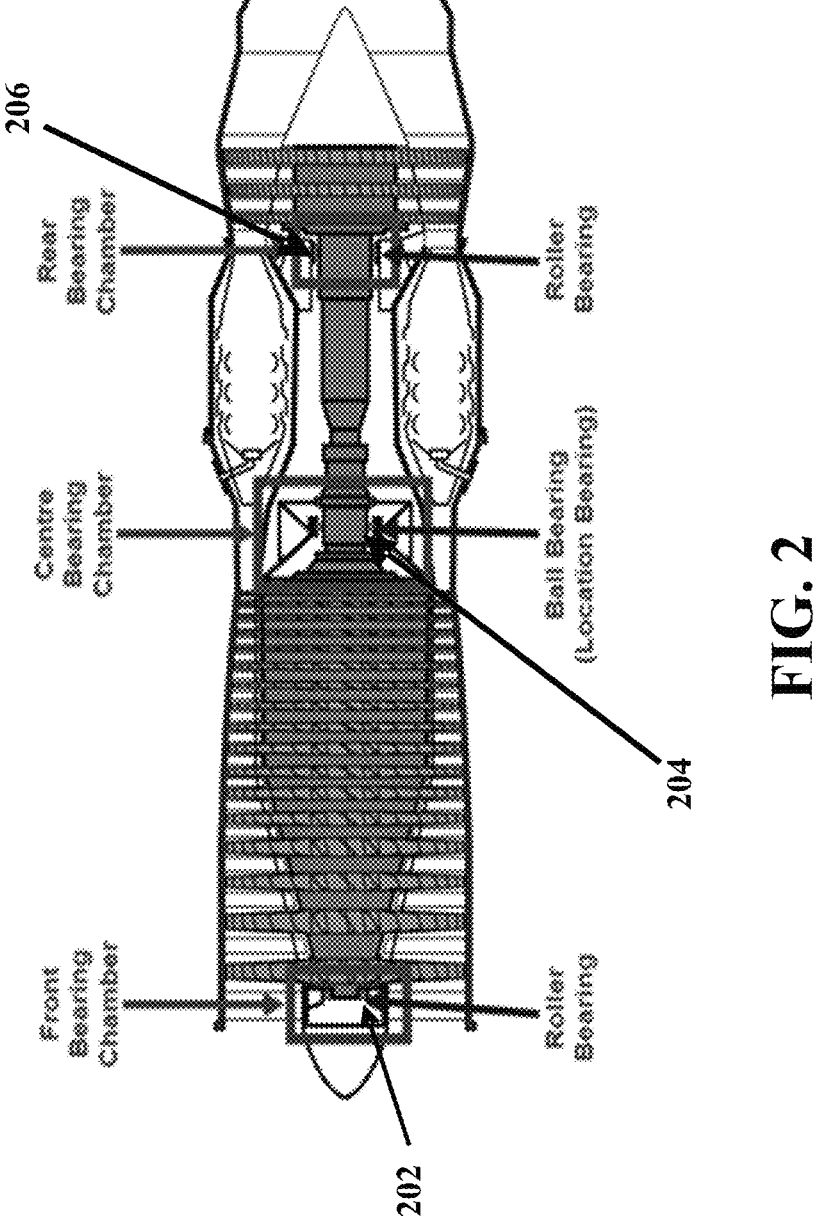
FIG. 2 illustrates an exemplary application of the apparatus shown in FIG. 1 according to aspects of the present disclosure.

FIG. 2 provides an illustration of a jet engine assembly 200 where the sensor system 100 of FIG. 1 could be employed. In this illustration, there are at least three difficult to reach locations; i.e., bearing chambers 202, 204, and 206, where roller or ball bearings are located and whose degradation status is critical to measure/know. By employing apparatus 100 in such locations, real time data of the progression of material degradation can be known, measured, sensed, monitored, and/or tracked.

Figure 3:
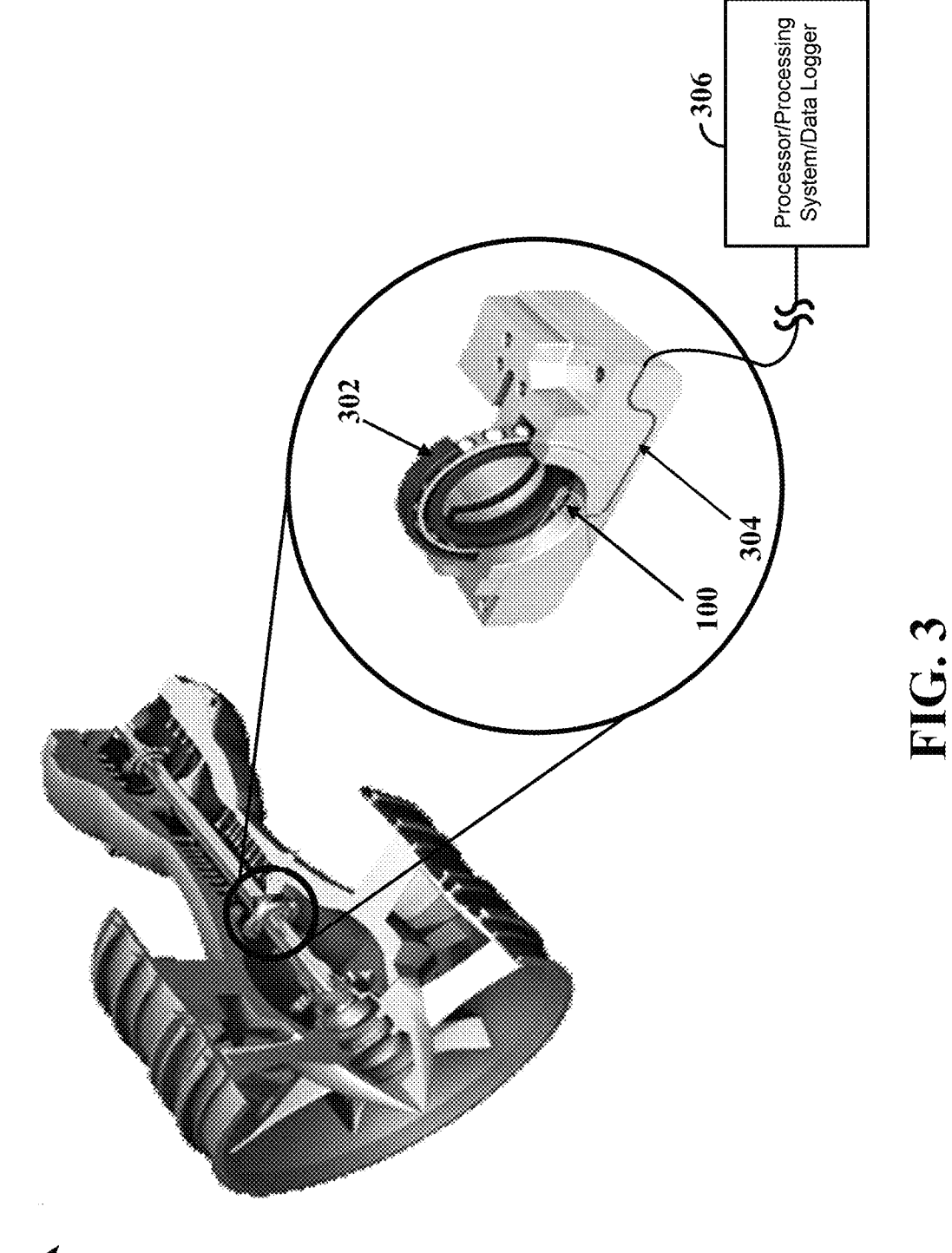
FIG. 3 illustrates another exemplary application of the apparatus of FIG. 1 according to aspects of the present disclosure.

FIG. 3 illustrates yet another example of an application in a jet engine assembly 300 where the sensor system 100 of FIG. 1 may be employed. In this example, the sensor system 100 may be placed on or next to a roller bearing assembly 302 shown in a cutaway view of the jet engine assembly at the left side of the drawing and also with an exploded and simplified view at the right side of the drawing. As degradation of the roller bearing assembly 302 occurs, the sensor 100 monitors change in mass of the sensor material or matrix (e.g., 102 in FIG. 1) due to accumulation of material resulting from degradation of the assembly 302. This information is communicated by a communicative coupling 304 to a data logger or directly to a processor shown generally at 306 for ease of monitoring.

FIG. 4 illustrates a flow diagram of an exemplary method 400 for monitoring mass degradation according to aspects of the present disclosure. As shown in FIG. 4, method 400 includes providing or disposing a customizable shaped material (e.g., aerogel) at or near a test material to be monitored for degradation (i.e., the material under test) as shown at block 402. Next, method 400 includes providing a pressure or force sensitive device (e.g., a piezoelectric sensor) that is coupled with or disposed on or within the customizable shaped material and is configured to output an electrical signal proportional to the pressure or force change on the device, which may be due to a change in the mass of the material (i.e., the aerogel material) as it absorbs or accumulates particles of the material under test as shown at block 404. As described before, this change in pressure or force results from the absorption or accumulation of material by the customizable shaped material from the material under test due to degradation in some examples.

Next method 400 includes periodically reading a plurality of output electrical signals from the force sensitive device (e.g., a piezoelectric device) as shown at block 406. Alternatively, this reading may be done continuously in real time to obtain a number of signals that can be used to determine change in mass of the customizable shaped material (i.e., degradation of the material under test). The read signals may also be logged or stored at block 408, although this may not be necessary if the electrical output is continuously monitored. Further, method 400 includes correlating changes in two or more of the plurality of measured, sensed, monitored, or logged electrical signals to sense a change in mass of the material under test for determining degradation of the test material as shown at block 410. This correlation may include reference to stored libraries or look up tables (LUTs) with parameters/information concerning the material properties/characteristics of the materials under test.

As those skilled in the art will appreciate, the present invention affords a very high resolution of mass sensing, customization capability, cost effectiveness due to no excess chemical testing required, significantly safer for a user as it can prevent catastrophic failure of components such as bearing components, a mission readiness as the asset in question would not have to be inoperable to conduct analysis, and/or a reduction of maintenance.

Moreover, it is noted that the disclosed MADS could be utilized in various applications and technologies such as piping and pipeline systems, HVAC systems, residential applications (e.g., detection of mold formation), or fire detection. Yet further applications may include chemical, radioactive, special operations, breachers, or on-body sensors. Still further applications of the disclosed MADS devices may include sensing of material in discharge fluid into the environment or contamination of bodies of water as contamination material accretes therein.

In other applications, it is noted that the system 100 could be employed in piping systems such as water, oil, or gas pipes or pipeline systems to detect degradation of piping. Yet other applications may include monitoring of pneumatic or hydraulic systems, vessels such as ships to determine deterioration thereof, purification testing, diagnostics, or quality control for heterogeneous salutation, or pollen monitoring.

In further aspects, the use of multiple MADS devices (e.g., multiples of system 100) could be placed in series with multiple stages (e.g., multiple step measurements) and further with different or varied porosities among the devices in series.

Furthermore, it is contemplated that by changing the material (e.g., material 102 in FIG. 1), the applications and temperature limits are varied and numerous.

Although the invention has been described in detail with reference to certain preferred embodiments, variations and modifications exist within the spirit and scope of the invention as described and defined in the following claims.

What is claimed is:

1. An apparatus for measuring the degradation of a material under test comprising:
   a first material disposed in proximity to or in contact with a second material under test and capable of accumulating a portion of the second material resultant from degradation of the second material; and
   a force measurement device mechanically coupled to the first material and configured to translate pressure, force, or strain exerted thereupon by the first material due to the mass of the first material including mass increase resultant from absorption of the portion of the second material into an electrical signal.

2. The apparatus of claim 1, wherein the electrical signal is proportional to a magnitude of the pressure, force, or strain.

3. The apparatus of claim 1, further comprising a processor configured to receive the electrical signal and compute a change in mass of the second material under test therefrom and, in turn, determine a degree of degradation of the second material under test based on the computed change in mass.

4. The apparatus of claim 3, wherein the change in mass comprises either an increase or a decrease in the mass of the first material.

5. The apparatus of claim 1, wherein the force measurement device comprises a piezoelectric sensor.

6. The apparatus of claim 1, wherein the first material comprises at least one of an adhesive or absorbent material causing the accumulation of the portion of the second material wherein the portion of the second material under test is absorbed into or adheres to the first material causing an increase in a total mass of the first material.

7. The apparatus of claim 6, wherein the first material comprises an aerogel.

8. A material degradation sensor for detecting degradation of a material under test comprising:

a first material disposed on the material under test, the first material having an absorbent property wherein particles of the material under test lost due to material degradation thereof may be absorbed into the first material causing an increase in total mass of the first material; and a force measurement device coupled with or in contact with the first material and configured to measure force exerted thereupon by the first material.

9. The sensor of claim 8, further comprising at least one processor communicatively coupled to the force measurement device and configured to receive a plurality of force measurement signals over a predetermined period from the force measurement device and compute a change in mass of the first material therefrom.

10. The sensor of claim 9, wherein the at least one processor is configured to correlate the computed change to a degree of degradation of the material under test.

11. The sensor of claim 8, wherein the force measurement device comprises a piezoelectric sensor.

12. The sensor of claim 8, wherein the first material comprises at least one of an adhesive or absorbent material causing the accumulation of particles of the material under test wherein the particles of the material under test are absorbed into or adhered to the first material causing an increase in a total mass of the first material.

13. The sensor of claim 8, wherein the first material comprises an aerogel.

14. The sensor of claim 8, wherein the first material is configured to be customizable to a particular shape or geometry.

15. A method for monitoring mass degradation in a material under test, the method comprising:

disposing a customizable shaped material at or near the material under test;

disposing a force sensitive device to be coupled with or disposed on the customizable shaped material and configured to output an electrical signal proportional to the pressure or force change on the device due to a change in mass of the customizable shaped material due to absorption or accumulation of particles of the material under test lost due to degradation.

16. The method of claim 15, further comprising:

one of periodically or continuously reading two or more output electrical signals from the force sensitive device; and determining the change in mass of the customizable shaped material based on the two or more read output electrical signals.

17. The method of claim 16, further comprising:

correlating a change in mass of the customizable shaped material to a change in mass of the material under test for determining degradation of the material under test.

18. The method of claim 17, wherein correlating includes reference to stored libraries or look up tables (LUTs) including parameters or information concerning the material properties or characteristics of the materials under test.

19. The method of claim 15, wherein the force sensitive device comprises a piezoelectric sensor.

20. The method of claim 15, wherein the customizable shaped material is configured to be customizable to a particular shape or geometry and comprises at least one of an adhesive or absorbent material causing the accumulation of particles of the material under test wherein the particles of the material under test are absorbed into or adhered to the customizable shaped material causing an increase in a total mass of the customizable shaped material.

* * * * *